United States Patent
Ishibashi et al.

(10) Patent No.: US 6,654,820 B1
(45) Date of Patent: Nov. 25, 2003

(54) SYSTEM CAPABLE OF RECORDING A CONTENT ONTO A RECORDING MEDIUM WHICH DOES NOT HAVE A MEDIUM ID

(75) Inventors: Yasuhiro Ishibashi, Ome (JP); Toru Kamibayashi, Chigasaki (JP); Masafumi Tamura, Chofu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/540,992

(22) Filed: Mar. 31, 2000

(30) Foreign Application Priority Data

Apr. 28, 1999 (JP) .............................. 11-122001

(51) Int. Cl.[7] .......................... G06F 13/00; G06F 13/10; G06F 12/14; G06F 12/16
(52) U.S. Cl. .............................. 710/34; 710/33; 710/55; 710/65; 710/68
(58) Field of Search ............................... 710/33, 34, 55, 710/65, 68

(56) References Cited

U.S. PATENT DOCUMENTS

| | | | |
|---|---|---|---|
| 4,720,859 A | * | 1/1988 | Aaro et al. .................. 713/169 |
| 5,109,413 A | | 4/1992 | Comerford et al. |
| 5,379,433 A | * | 1/1995 | Yamagishi ................... 713/200 |
| 5,629,980 A | | 5/1997 | Stefik et al. |
| 6,122,245 A | * | 9/2000 | Kondo et al. ............. 369/275.4 |
| 6,209,097 B1 | * | 3/2001 | Nakayama et al. ......... 713/193 |
| 6,438,235 B2 | * | 8/2002 | Sims, III .................... 380/285 |

* cited by examiner

Primary Examiner—Rehana Perveen
(74) Attorney, Agent, or Firm—Finnegan, Henderson, Farabow, Garrett & Dunner, L.L.P.

(57) ABSTRACT

If a recording medium having a medium ID is used, a secure manager manages enciphering/decoding of a content with use of the medium ID for each recording medium. If a HDD having no medium ID is used, the secure manager obtains a device ID specific to a computer system through a BIOS and manages enciphering/decoding of a content to be recorded into the HDD, with use of the device ID. The device ID is stored in a safe area in the computer system. As a result, even if a content is recorded into an open recording medium such as a hard disk drive, the content can be protected from improper use so that utility and protection of digital contents can be improved.

21 Claims, 5 Drawing Sheets

SYSTEM CAPABLE OF RECORDING A CONTENT ONTO A RECORDING MEDIUM WHICH DOES NOT HAVE A MEDIUM ID

CROSS-REFERENCE TO RELATED APPLICATIONS

This application is based upon and claims the benefit of priority from the prior Japanese Patent Application No. 11-122001, filed Apr. 28, 1999, the entire contents of which are incorporated herein by reference.

BACKGROUND OF THE INVENTION

The present invention relates to a computer system and a content protect method applied to the computer system.

In recent years, various personal computers applicable to multimedia have been developed in accordance with developments in computer technology. In personal computers of this kind, various digital contents such as image data, music data, and the like can be downloaded and used via networks.

Those digital contents can be downloaded without degrading quality by adopting digital coding techniques such as MPEG2, MP3, and the like. However, in view of protection of copyrights, demands have recently arisen for a technique for protecting digital contents against improper use.

However, since a personal computer is basically a system which has an open architecture, it is actually difficult to protect digital contents in personal computers. This is because digital contents are dealt with as files in personal computers and the files can be freely copied or moved basically. In particular, hard disk drives used as storage devices for personal computers have open specifications, and it is therefore difficult to conceal digital contents recorded in hard disk drives. Consequently, after a digital content downloaded from the internet is once recorded into a hard disk drive, the digital content can be freely copied from this hard disk to another medium and then put to use.

BRIEF SUMMARY OF THE INVENTION

Accordingly, it is an object of the present invention to provide a computer system and a content protect method which are capable of protecting contents against improper use even when contents are recorded on an open recording medium such as a hard disk drive, so that both utility and protection of digital contents can be improved.

According to an aspect of the present invention, there is provided a computer system which is capable of recording a content onto a recording medium, comprising: ID storage means for storing an ID corresponding to the recording medium to manage the content to be stored thereon, the ID storage means being separately provided from the recording medium; and content management means for enciphering the content by referring to an ID corresponding to the recording medium from the ID storage means and recording the enciphered content onto the recording medium.

According to another aspect of the present invention, there is provided a computer system which is capable of recording a content onto a recording medium, comprising: ID storage means for storing control information for limiting reproducing/copying/moving of the content and an ID corresponding to the recording medium, the ID storage means being separately provided from the recording medium; and content management means for, when a request is issued for reproducing the content recorded on the recording medium, copying the content to another recording medium, or moving the content to another recording medium, for permitting or inhibiting execution of processing corresponding to the request, based on the control information and the ID.

According to another aspect of the present invention, there is provided a computer system comprising: device ID storage means for storing a device ID used for safety management of contents; and content management means capable of managing enciphering/decoding of a content, for each recording medium onto which the content is to be recorded, with use of a medium ID specific to the recording medium onto which the content is to be recorded, for managing the enciphering/decoding of the content with use of the device ID if the content is recorded onto a recording medium which does not have a medium ID.

According to another aspect of the present invention, there is provided a computer system comprising: device ID storage means for storing a device ID used for safety management of contents; and content management means capable of managing enciphering/decoding of a content, for each recording medium onto which the content is to be recorded, with use of a medium ID specific to the recording medium onto which the content is to be recorded, for managing the enciphering/decoding of the content with use of the device ID if the content is recorded onto a recording medium which does not have a medium ID, wherein the device ID of the device ID storage means is managed by a BIOS of the computer system, the content management means obtains the device ID from the BIOS upon identification from the BIOS, the content is added with control information for limiting reproducing/copying/moving of the content, the BIOS manages code data for detecting alteration to the control information, and if a content recorded on a recording medium which does not have a medium ID is copied to another recording medium, control information in the recording medium which does not have a medium ID is updated such that a value indicating possible copy operations allowed for the content is decremented by one, the content recorded on the recording medium which does not have a medium ID and the updated control information are copied to the another recording medium, and a value of the code data for detecting alteration is updated based on the updated control information.

According to another aspect of the present invention, there is provided a computer system capable of dealing with contents and comprising content management means for performing safety management of the contents, the content management including: means for, when a content is recorded onto a recording medium having a medium ID, enciphering the content or an encipher key thereof with use of the medium ID and recording the content onto the recording medium; and means for, when a content is recorded onto a recording medium which does not have a medium ID, enciphering the content or an encipher key thereof with use of a device ID specific to the computer system managed by a BIOS of the computer system, and recording the content onto the recording medium which does not have a medium ID.

According to another aspect of the present invention, there is provided a computer system comprising: a system program for controlling of the computer system, the system program managing a device ID specific to the computer system; and content management system for managing enciphering/decoding of a content to be recorded onto a recording medium of the computer system, with use of the device ID specific to the computer system.

According to another aspect of the present invention, there is provided a computer system having a device ID specific to the computer system, comprising content management means for obtaining the device ID from the computer system and for managing enciphering/decoding contents to be recorded on a recording medium of the computer system.

According to another aspect of the present invention, there is provided a content protect method applied to a computer system capable of dealing with contents to protect the contents against improper use, comprising: if a content is recorded onto a recording medium having a medium ID, enciphering the content or an encipher key thereof with use of the medium ID and recording the content onto the recording medium having the medium ID; and if a content is recorded onto a recording medium which does not have a medium ID, enciphering the content or an encipher key thereof with use of a device ID specific to the computer system managed by a BIOS in the computer system and recording the content onto the recording medium which does not have a medium ID.

According to another aspect of the present invention, there is provided a content protect method for protecting contents dealt with in a computer system having a device ID specific to the computer system against improper use, comprising: obtaining the device ID from the computer system; and managing enciphering/decoding of a content to be recorded onto a recording medium of the computer system with use of the device ID.

According to another aspect of the present invention, there is provided a content protect method for protecting contents dealt with in a computer system against improper use, comprising: managing a device ID specific to the computer system by a system program for hardware control of the computer system; obtaining the device ID from the system program; and managing enciphering/decoding of a content to be recorded onto a recording medium of the computer system with use of the device ID.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Hereinafter, referring to the accompanying drawings, an embodiment of the present invention will be explained.

Figure 1:
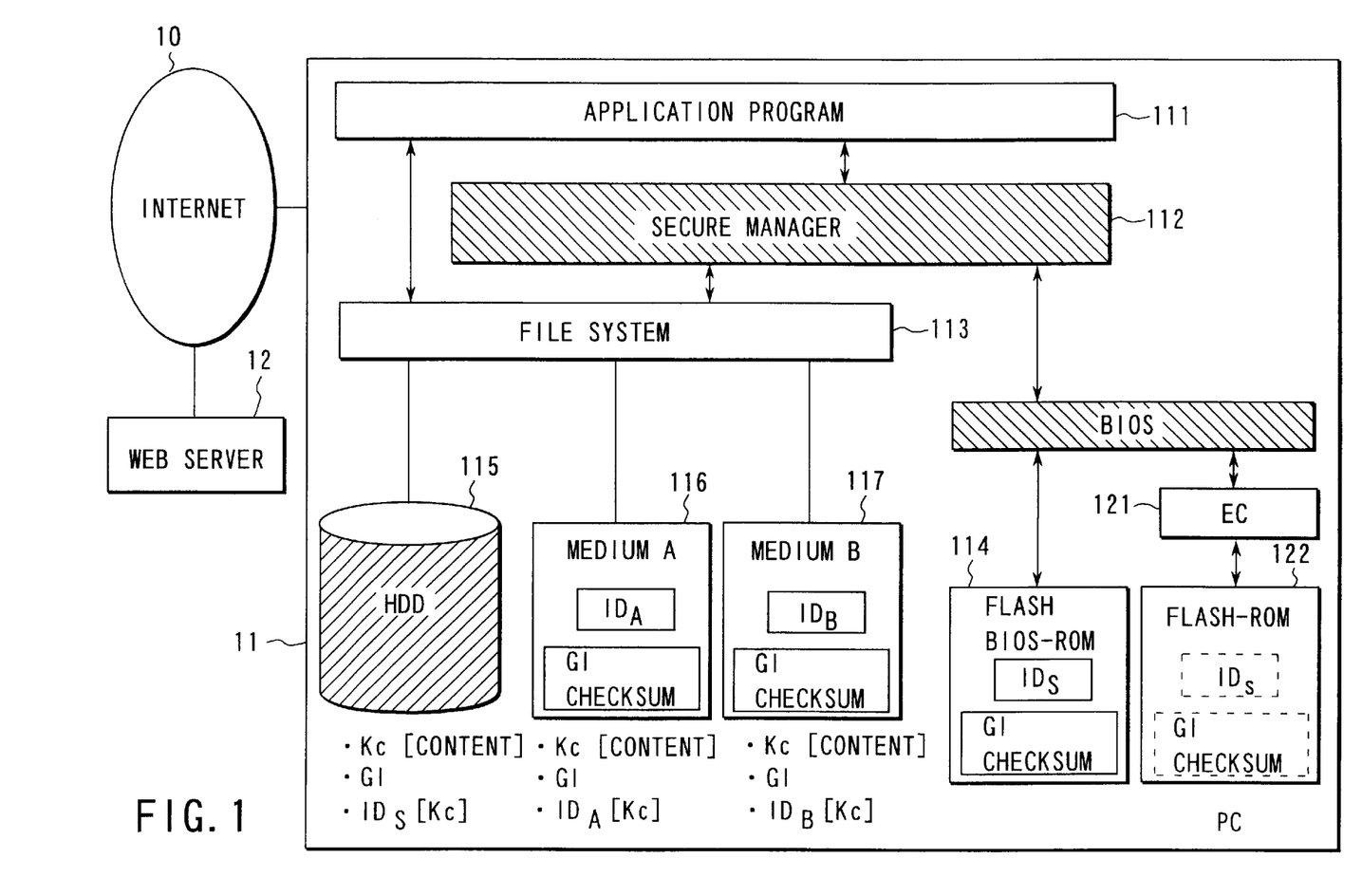
FIG. 1 is a block diagram showing a basic structure of a computer system according to an embodiment of the present invention.

FIG. 1 shows a system configuration of a personal computer according to the embodiment of the present invention. This personal computer (PC) 11 is a computer system capable of dealing with various digital contents such as image data, music data, and the like. The method of protecting contents in this computer 11 premises that for each recording medium on which contents should be recorded, enciphering/decoding of contents is managed with use of one medium ID specific to the recording medium. This method is adopted in order that data on one same recording medium can be reproduced even in other personal computers or electronic devices and the contents are enciphered and recorded with use of a specific medium ID prepared for each recording medium. Management of enciphering/decoding of contents with use of the medium ID is executed by a secure manager 112 which is software specialized for management. The secure manager 112 is realized as tambour resistant software. The tambour resistant software means software having a defense function against an attack such as malicious internal analysis or alteration.

The secure manager 112 is positioned between an application program 111 and a file system 113 as shown in the figure, and various operations such as "recording", "reproducing", "copying", and "moving" are executed on contents to be protected by the secure manager 112. Enciphering/decoding management for contents, which is executed by the secure manager 112, is roughly classified into a class (1) of recording media each having specific medium ID and (2) for ordinary recording media each having no medium ID.

(Recording Medium Having A Medium ID)

Explained first will be the processing on a recording medium having a medium ID.

A recording medium (A) 116 and a recording medium (B) 117 are respectively specialized recording media which are compatible with the secure manager 112. These media may be of various kinds (SSFDC, flash PC cards, mini disks, and the like), e.g., memory cards detachably attached to the personal computer 11 or other various electronic devices.

In the recording medium (A) 116, there are provided a ROM area where a medium ID ($ID_A$) is previously stored, and a GI checksum area for storing GI checksum data prepared from a GI (Governance Information) table which will be described later, in addition to an ordinary data storage area. The recording medium (B) 117 has a similar structure. The medium ID need only be specific to a recoding medium, and may be a serial number, product number, or any other various identification information.

The GI table is copy control information which defines possibilities concerning reproducing, copying, and moving, and the numbers of times for which copying and moving are respectively permitted, for each content to be protected. The GI checksum data is code data for detecting alteration to the contents of the GI table and is calculated from values in the GI table. The value of "possible copy operations" is decremented by 1 every time copying is executed. Thus, every time a value in the GI table is updated, the value in the GI checksum data is updated accordingly. Therefore, the GI checksum area is formed as a rewritable area.

Both the ROM area and the GI checksum area are secure areas which cannot be accessed from users.

When recording a content onto the recording medium (A) 116, the secure manager 112 manages enciphering/decoding of the content with use of the medium ID of the recording medium (A) 116. In this case, the following data is stored into the data area of the recording medium (A) 116.

Kc [Content]: a content enciphered with a secret key called a content key Kc

GI $ID_A$ [Kc]: a content key enciphered with the medium ID ($ID_A$) of the recording medium (A) 116

When reproducing a content recorded in the recording medium (A) 116, the secure manager 112 firstly decodes the $ID_A$ [Kc] with use of the medium ID ($ID_A$) of the recording medium (A) 116 to obtain Kc. Further, Kc [Content] is decoded.

If the content recorded in the recording medium (A) 116 is a copiable content, the content can be copied from the recording medium (A) 116 to another recording medium (e.g., recording medium (B) 117). In this case, the secure manager 112 generates checksum data from the GI stored in the recording medium (A) 116, and compares the checksum data with the GI checksum data of the GI checksum area of the recording medium (A) 116. If both data are not equal, copying is inhibited. If equal, the secure manager 112 decodes the $ID_A$ [Kc] with use of the medium ID ($ID_A$) of the recording medium (A) 116 thereby to obtain Kc. Next, the secure manager 112 enciphers Kc with use of the medium ID ($ID_B$) of the recording medium (B) 117 as a copy destination and writes an enciphered content key ($ID_B$ [Kc]) together with the Kc [Content] and GI into the data area of the recording medium (B) 117. In this case, the number of possible copy operations specified by the GI is decremented by one (−1) in each of the recording medium (A) 116 and the recording medium (B) 117. For example, if the copied content is a content "which can be copied only once", the content is changed to a content "which cannot be copied any more". As the GI is updated, the values of the checksum data of the recording medium (A) 116 and the recording medium (B) 117 are updated.

If a content recorded in the recording medium (A) 116 is a movable content, the content can be moved from the recording medium (A) 116 to another recording medium (B) 117. In this case, the secure manager 112 generates checksum data from GI stored in the recording medium (A) 116 and compares the checksum data with the GI checksum datum in the GI checksum area in the recording medium (A) 116. If both data are not equal to each other, moving is inhibited. If equal, the secure manager 112 decodes $ID_A$ [Kc] with use of the medium ID ($ID_A$) of the recording medium (A) 116 thereby to obtain Kc. Next, the secure manager 112 enciphers Kc with use of the medium ID ($ID_B$) of the recording medium (B) 117 as a move destination and writes an enciphered content key ($ID_B$ [Kc]) together with the Kc [Content] and GI into the data area of the recording medium (B) 117. Thereafter, the secure manager 112 deletes Kc [Content], GI, and $ID_A$ [Kc] stored in the data area in the recording medium (A) 116 as a moving origin and also deletes the GI checksum data in the GI checksum area. If GI defines only the "number of possible copy operations" but does not define the "number of possible move operations", GI is not updated by the move. If the "number of possible move operations" is defined, GI is written into the recording medium (B) 117, and updated checksum data corresponding to GI is written into the GI checksum area, like in the case of the "copy" described above.

(Recording Medium Having No Medium ID)

Explained next will be the processing on a recording medium having no medium ID. A HDD 115 is a storage device which is used as a secondary storage device fixed in a personal computer 11. The HDD 115 is not provided with ROM areas such as a recording medium (A) 116 and a recording medium (B) 117 or a GI checksum area.

When recording, copying, or moving a content with use of the HDD 115, the secure manager 112 manages enciphering/decoding of the content with use of a device ID specific to the personal computer 11 in place of a medium ID. That is, if the record destination, copy destination or origin, or move destination or origin is assigned to the drive number corresponding to the HDD 115, the secure manager 112 does not use the medium ID but uses the device ID managed in the system. In this case, for example, with use of plug and play function or the like, the secure manager 112 may recognize which recording medium assigned to what drive number has a medium ID and which recording medium assigned to what drive number has no medium ID, for each medium.

The device ID specific to the PC 11 is managed under the control of a BIOS as a system program for controlling hardware of the PC 11. Under this BIOS, a flash BIOS-ROM 114, an embedded controller (or a sub CPU) 121, and a flash ROM 122 are provided.

Figure 2:
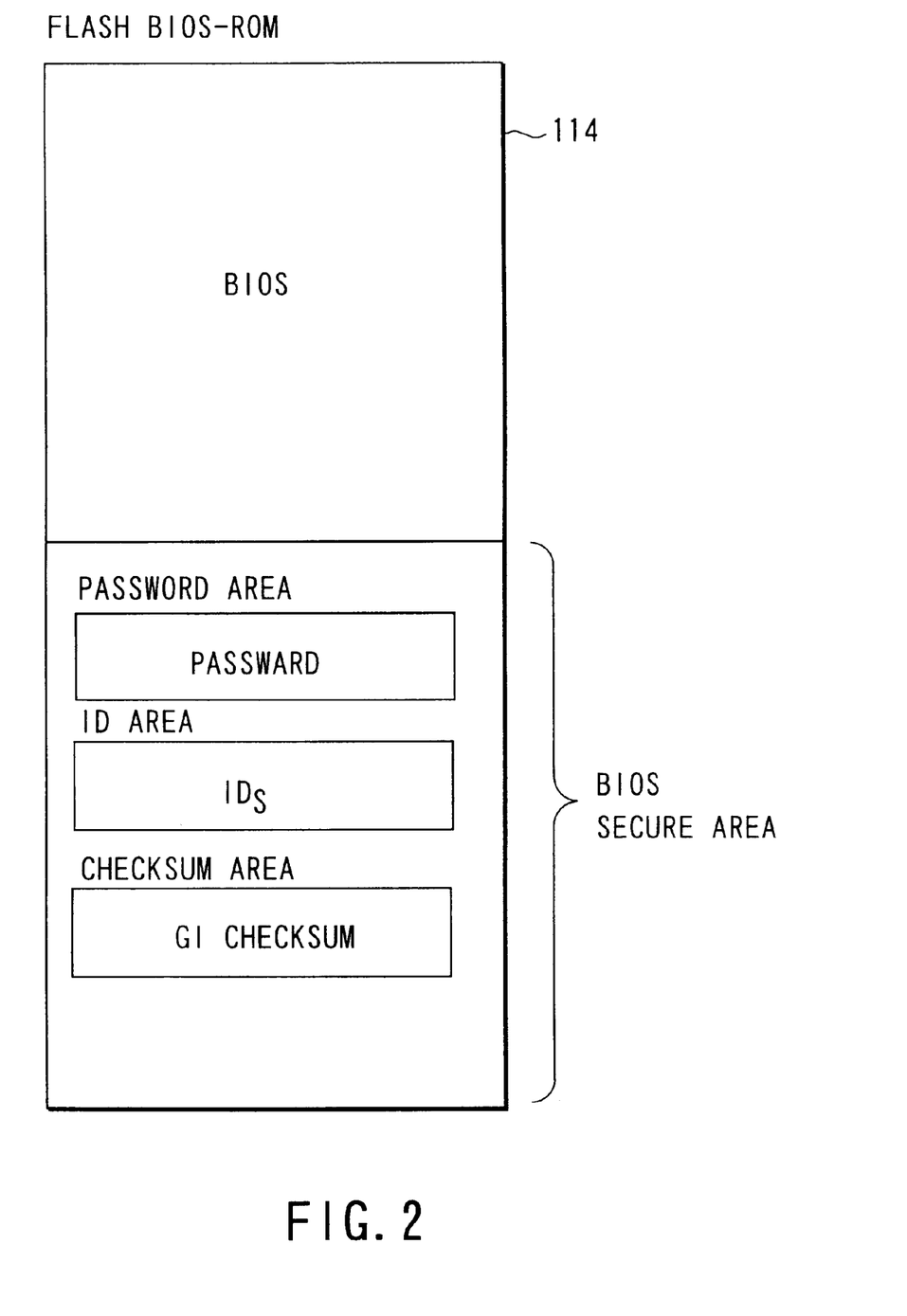
FIG. 2 is a view showing an example of contents stored in a flash BIOS-ROM provided in the computer system according to the embodiment.

The flash BIOS-ROM 114 has a secure area which cannot be accessed from users and where an ID area and a checksum area are provided, in addition to a password area, as shown in FIG. 2. The password area is an area for storing a password registered by a user. If a password is registered, whether or not an inputted password from a user and the registered password are equal to each other is determined when the power is turned on. Only if both passwords are equal, booting of the OS or recovery from a suspend/hibernation mode is enabled.

A device ID ($ID_S$) specific to the PC 11 is previously stored in the ID area. The checksum area is used to store GI checksum data prepared from GI of a content stored in the HDD 115.

On the other hand, the embedded controller 121 corresponds to, e.g., a keyboard controller or a power supply controller and is capable of accessing the flash ROM 122 under the control of the BIOS. The flash ROM 122 has a secure area which is the same as in the flash BIOS-ROM 114.

The above device ID ($ID_S$) and GI checksum data may be stored in any one of the flash BIOS-ROM 114 and the flash ROM 122. In this embodiment, the case where the secure area of the flash BIOS-ROM 114 is used, will be described.

The BIOS is provided with an identification function to execute identification processing with respect to the secure manager 112. If programs are confirmed as being proper from each other by the identification processing between the secure manager 112 and the BIOS, the secure manager 112 can obtain a device ID ($ID_S$) from the BIOS. Since the device ID can thus be obtained for the first time through identification from the BIOS, the device ID can be managed more safely.

Next, a procedure of content management processing when using the HDD 115 will be specifically explained with reference to FIGS. 3 and 5.

"Recording"

Figure 3:
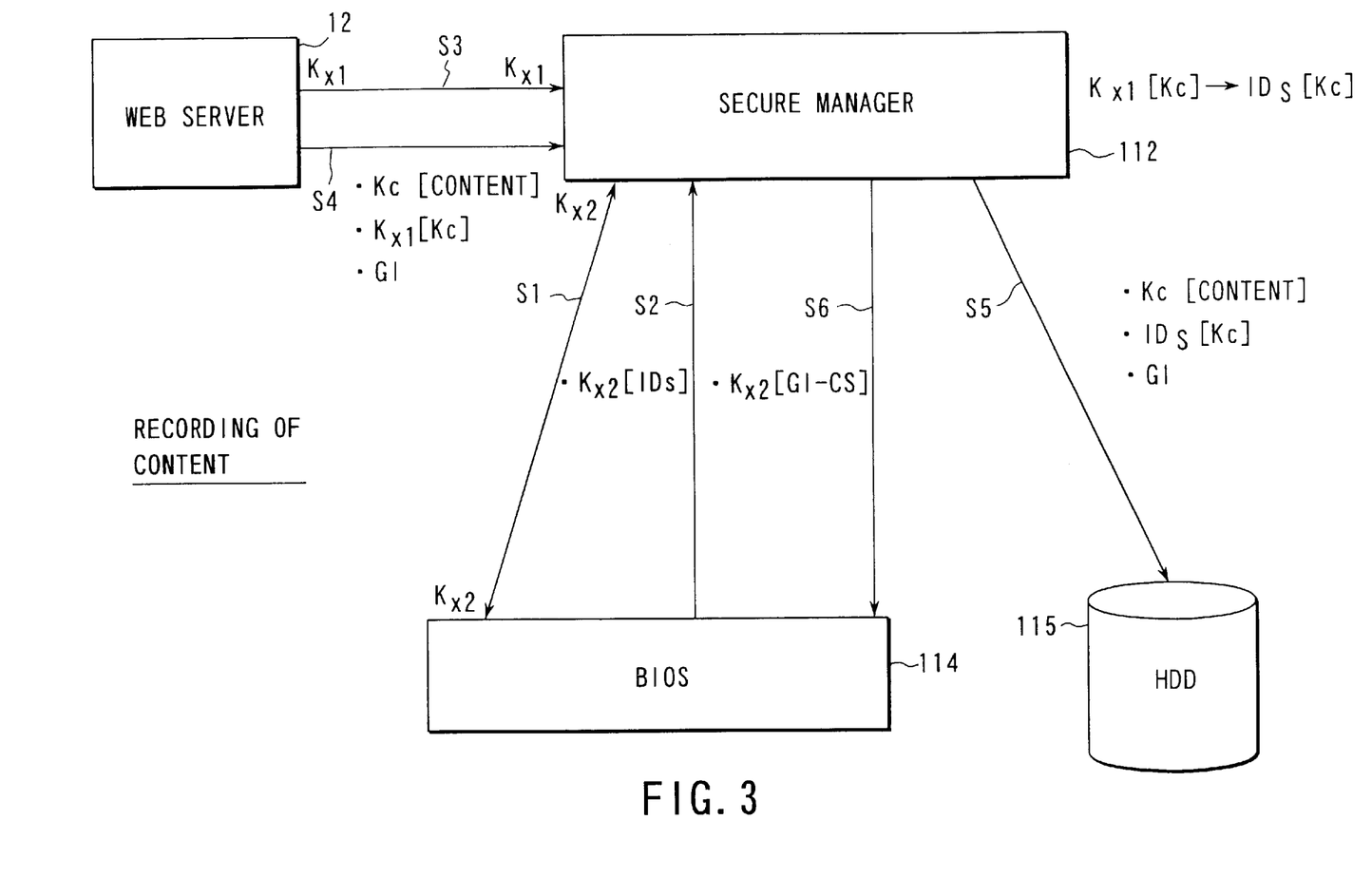
FIG. 3 is a view showing a procedure of content recording processing executed in the computer system according to the embodiment.

FIG. 3 shows a flow of operation in recording.

Step S1

When the PC 11 is started, identification processing is executed first between the secure manager 112 and the BIOS. If programs are confirmed as being proper from each other, key exchange is carried out between the secure manager 112 and the BIOS and one same identification key (Kx2) is shared. The identification key is a time-based variable key which varies for every time.

Step S2

The secure manager 112 issues an ID obtain request to the BIOS. In response to the ID obtain request from the secure manager 112, the BIOS enciphers the device ID ($ID_S$) with use of the identification key (Kx2) and transmits the enciphered device ID (Kx2 [$ID_S$]) to the secure manager 112. Since the secure manager 112 holds the identification key (Kx2), the manager 112 can decipher $ID_S$ from the Kx2 [$ID_S$].

Step S3

When downloading a content such as image data or music data from a WEB server with use of an application program such as a WEB browser or the like, identification processing is carried out through the WEB browser or directly between the secure manager 112 and the WEB server 12. If the manager 112 and the server 12 confirm each other as having protect functions, key exchange is carried out between the secure manager 112 and the WEB server 12 and one same identification key (Kx1) is shared. The identification key is a time-based variable key which varies for every time.

Step S4

The WEB server 12 transmits a requested content enciphered by a predetermined content key Kc (Kc [Content]), a content key (Kx1 [Kc]) enciphered by the identification key (Kx1), and GI to the PC 11.

Step S5

Kc [Content], Kx1 [Kx], and GI are sent to the secure manager 112 through the WEB browser or the like. If the recording medium as a download destination specified by the WEB browser is the HDD 115, the secure manager 112 converts Kx1 [Kc] into $ID_S$ [Kc] with use of the identification key (Kx1) and the device ID ($ID_S$) obtained from the BIOS. In this case, at first, Kx1 [Kc] is decoded into Kc with use of the identification key (Kx1), and the Kx is enciphered again by $ID_S$.

The secure manager 112 thereafter writes Kc [Content], $ID_S$ [Kc], and GI into the HDD 115 through the file system 113 and further through an IDE driver or the like.

Step S6

The secure manager 112 calculates GI checksum data (GI_CS) from GI, enciphers the data with use of the identification key (Kx2) common to the BIOS, and transfers the enciphered data to the BIOS. The BIOS writes the GI checksum data kept enciphered or after decoding, into the checksum area in the flash BIOS_ROM 114. Of course, it may be arranged such that the secure manager 112 directly writes the GI checksum data or enciphered data thereof into the checksum area of the flash BIOS ROM 114.

"Reproducing"

Figure 4:
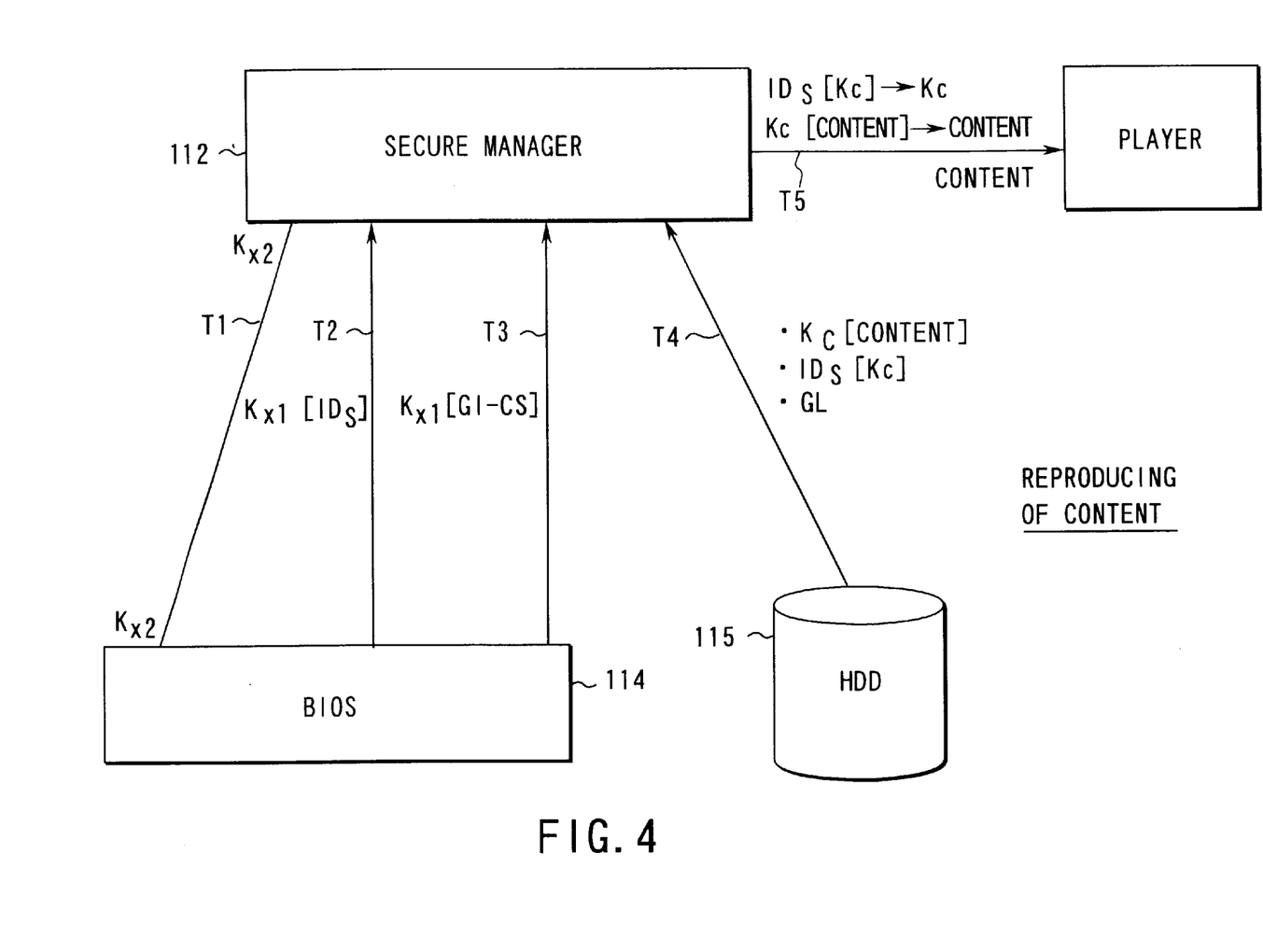
FIG. 4 is a view showing a procedure of content reproducing processing executed in the computer system according to the embodiment.

FIG. 4 shows a flow of operation in reproducing of a content.

Step T1

When starting the PC 11, identification processing is executed first between the secure manager 112 and the BIOS. If programs are confirmed as being proper from each other, key exchange is carried out between the secure manager 112 and the BIOS, and one same identification key (expressed as Kx1 in this case) is shared. The identification key is a time-based variable key which varies for every time.

Step T2

In response to an ID obtain request from the secure manager 112, the BIOS enciphers a device ID ($ID_S$) with use of the identification key (Kx1) and transmits the enciphered device ID (Kx1 [$ID_S$]) to the secure manager 112. Since the secure manager 112 holds the identification key (Kx1), the manager 112 can decipher $ID_S$ from the Kx1 [$ID_S$].

Step T3

Next, in response to an obtain request for GI checksum data from the secure manager 112, the BIOS enciphers GI checksum data (GI_CS) with use of the identification key (Kx1) and transmits the enciphered GI checksum data (Kx1 [GI_CS]) to the secure manager 112. Since the secure manager 112 holds the identification key (Kx1), the manager 112 can decipher GI_CS from Kx1 [GI_CS].

Step T4

The secure manager 112 obtains an enciphered content (Kc [Content]) as a reproduce target specified by an application program 111 or the like, $ID_S$ [Kc] corresponding thereto, and GI from the HDD 115 through an IDE driver or the like.

Step T5

The secure manager 112 calculates a checksum from GI and compares the calculated checksum with GI_CS obtained from the BIOS. If the checksum and GI_CS are not equal to each other, there is a possibility that GI of the HDD 115 has been overwritten by a malicious user and the reproduce processing is stopped at this time point. If equal, the secure manager 112 decodes $ID_S$ [Kc] with use of $ID_S$ obtained from the BIOS to obtain Kc. Further, the manager 112 unlocks the cipher of Kc [Content] with use of the Kc and transmits a raw content (Content) to reproducing software (player). The reproducing software is realized as tambour resistant software.

"Copying"

Figure 5:
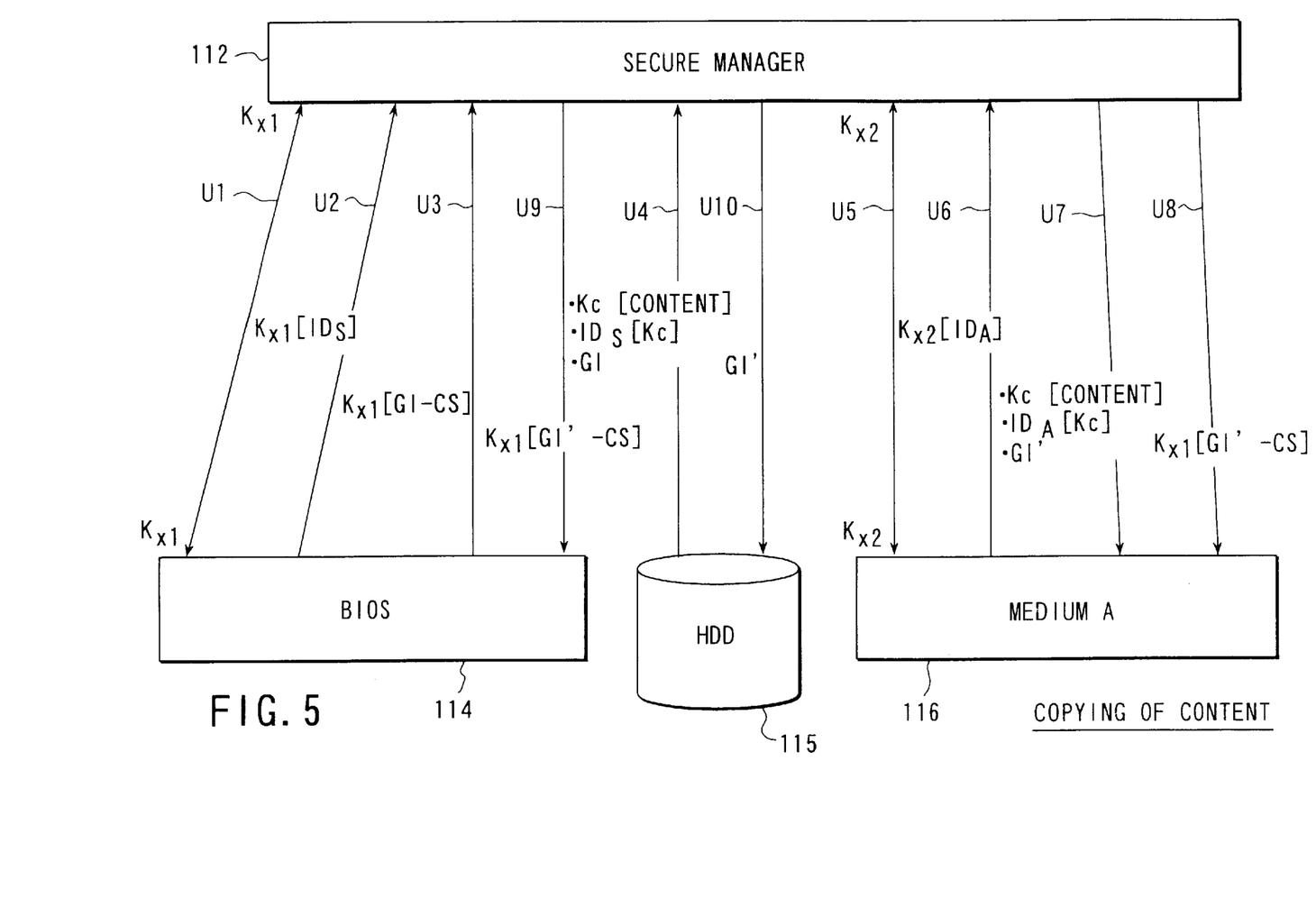
FIG. 5 is a view showing a procedure of content copying processing executed in the computer system according to the embodiment.

FIG. 5 shows a flow of operation in copying of a content. The following exemplifies a case where a content recorded in the HDD 115 is copied to a recording medium (A) 116.

Step U1

When starting PC 11, identification processing is executed first between the secure manager 112 and the BIOS. If programs are confirmed as being proper from each other, key exchange is carried out between the secure manager 112 and the BIOS, and one same identification key (expressed as Kx1 in this case) is shared. The identification key is a time-based variable key which varies for every time.

Step U2

In response to an ID obtain request from the secure manager 112, the BIOS enciphers a device ID ($ID_S$) with use of the identification key (Kx1) and transmits the enciphered device ID (Kx1 [$ID_S$]) to the secure manager 112. Since the secure manager 112 holds the identification key (Kx1), the manager 112 can decipher $ID_S$ from the Kx1 [$ID_S$].

Step U3

Next, in response to an obtain request for GI checksum data from the secure manager 112, the BIOS enciphers GI checksum data (GI_CS) with use of the identification key (Kx1) and transmits the enciphered GI checksum data (Kx1 [GI_CS]) to the secure manager 112. Since the secure manager 112 holds the identification key (Kx1), the manager 112 can decipher GI_CS from Kx1 [GI_CS].

Step U4

The secure manager 112 obtains an enciphered content (Kc [Content]) as a copy target specified by an application program 111 or the like, $ID_S$ [Kc] corresponding thereto, and GI from the HDD 115 through an IDE driver or the like. The secure manager 112 calculates a checksum from GI and compares the calculated checksum with GI_CS obtained from the BIOS. If the checksum and GI_CS are not equal to each other, there is a possibility that GI of the HDD 115 has been overwritten by a malicious user and the copy processing is stopped at this time point. If equal, the secure manager 112 refers to GI in the HDD 115 and checks whether or not the content as the target to be copied is a copiable content. If "copy impossible" or the "number of possible copy operations=0", the copy processing is stopped at this time point. If the content is allowed to be copied, the secure manager 112 goes to the processing in the next step U5 and later.

Step U5

The secure manager 112 executes identification processing from the recording medium (A) 116 as a copy destination or a device driver for controlling the medium. If the manager 112 and the medium (A) 116 or the device driver thereof confirm each other as having proper content protect functions, key exchange is carried out between the secure manager 112 and the recording medium (A) 116 as the copy destination, one same identification key (expressed as Kx2 in this case) is shared. The identification key (Kx2) is a time-based variable key.

Step U6

In response to an ID obtain request from the secure manager 112, the recording medium (A) 116 or the device driver thereof enciphers the medium ID ($ID_A$) with use of the identification key (Kx2) and transmits the enciphered medium ID (Kx2 [$ID_A$]) to the secure manager 112. Since the secure manager 112 holds the identification key (Kx2), the manager 112 can decipher $ID_A$ from Kx2 [$ID_A$].

Step U7

The secure manager 112 updates GI obtained from the HDD 115 to obtain GI' whose "number of possible copy operations" has been decremented by one (−1). Further, the secure manager 112 decodes $ID_S$ [Kc] with use of the device ID ($ID_S$) obtained from the BIOS. Next, the secure manager 112 enciphers Kc with use of the medium $ID_A$ to obtain $ID_A$ [Kc]. The secure manager 112 thereafter writes Kc [Content], $ID_A$ [Kc], and GI, into the file system 113 and also into the recording medium (A) 116 through the driver of the recording medium (A) 116 or the like.

Step U8

The secure manager 112 calculates checksum data (GI'_CS) from GI' and transmits Kx2[GI'_CS], which is obtained by enciphering the calculated checksum data with use of the identification key (Kx2), to the recording medium (A) 116 or the driver thereof. The manager 112 further writes GI'_CS into the GI checksum area in the recording medium (A) 116.

Step U9

The secure manager 112 thereafter enciphers the checksum data (GI'_CS) with use of the identification key (Kx1) and transmits the enciphered checksum data to the BIOS. The BIOS overwrites the contents of the checksum area of the flash BIOS_ROM 114 with GI'_CS.

Step U10

The secure manager 112 further updates GI of the HDD 115 to GI'.

"Moving"

If a content recorded in the HDD 115 is moved to the recording medium (A) 116, processing is carried out in a procedure basically similar to the copy processing shown in FIG. 5. The present processing, however, differs in that processing for deleting the contents of the checksum area of the flash BIOS_ROM 114 is executed in place of the step U9 and that processing for deleting Kc [Content] and $ID_S$ [Kc] from the HDD 115 is executed in place of the step U10 shown in FIG. 5. Also, in the case of moving, GI is not updated with respect to the number of possible copy operations, so GI is written into the recording medium (A) 116 as a move destination without updating GI except the case where the number of possible move operations is defined.

As described above, in the present embodiment, the BIOS is provided with an identification function and a device ID management function with respect to the secure manager 112. Therefore, even when a content is recorded into a recording medium which has no medium ID, protection of the contents recorded in the medium can be improved like in the case of using a specialized recording medium having a medium ID.

In particular, since the device ID and GI checksum data are managed by the BIOS and cannot be accessed from the system side, it is possible to protect contents downloaded onto the HDD 115 without making any changes to the HDD 115.

In the present embodiment, although the content key as an encipher key for a content is enciphered with use of a medium ID or device ID, the medium ID or device ID may be used as a content key and the content itself may be enciphered with use of the medium ID or device ID.

Also, in the present embodiment, a HDD is exemplified as a storage medium which does not have a medium ID. However, the content protect method according to the present embodiment for managing enciphering/decoding with use of a device ID is applicable to all ordinary non-volatile storage media such as MOs, memory cards (including PC cards and compact flash cards), smart media, and the like that do not have a medium ID.

In addition, the device ID need only be stored into a safe storage device in the PC 11. For example, the device ID may be stored in a embedded controller (EC) in the PC 11 or in a CMOS memory backed up by a battery in a real-time clock provided in the PC 11. Wherever the device ID is stored in the PC 11, necessary processing can be executed without considering the storage place for the device ID if the device ID is obtained through the BIOS.

Further, the present embodiment is not limited to PCs but is applicable to any data processing devices (or devices using a computer) that mount a microprocessor.

Also, if a computer program containing functions of the secure manager 112 is introduced, i.e., the procedure of obtaining a device ID from a BIOS and managing enciphering/decoding of contents with use of the device ID and the procedure of managing enciphering/decoding of contents with use of a medium ID in case of a recording medium having a medium ID are introduced via a communication medium or a recording medium, any system can attain the same advantages as those of the present embodiment as long as the system is capable of managing device $ID_S$ by the BIOS.

Further, since the BIOS can be updated, the same advantages as those of the present embodiment can be attained in an existing computer if a new BIOS having an identification function, a device ID, and a management function in addition to an ordinary hardware control function is introduced to the computer via a communication medium or a recording medium.

As has been specifically described, according to the present invention, contents can be protected against improper use even when contents are recorded on an open recording medium such as a hard disk drive or the like. Thus, both utilization and protection of digital contents can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system which is capable of recording a content onto a recording medium which does not have a medium ID, comprising:
an ID storage device configured to store an ID used for the recording medium which does not have a medium ID to manage the content to be stored thereon, the ID storage device being separately provided from the recording medium; and
a content manager configured to encipher the content by referring to the ID used for the recording medium which does not have a medium ID from the ID storage device and record the enciphered content onto the recording medium.

2. The system according to claim 1, wherein
the ID of the ID storage device is managed by a BIOS of the computer system, and
the content manager obtains the ID from the BIOS upon identification from the BIOS.

3. The system according to claim 2, wherein
the ID storage device is constructed by a BIOS-ROM for storing the BIOS, and
the BIOS-ROM has a safe area which cannot be accessed by users and where the ID is stored.

4. A computer system which is capable of recording a content onto a recording medium which does not have a medium ID, comprising:
an ID storage device configured to store control information for limiting reproducing, copying, or moving of the content and an ID used for the recording medium which does not have a medium ID, the ID storage device being separately provided from the recording medium; and
a content manager configured to, when a request is issued for reproducing the content recorded on the recording medium which does not have a medium ID, copying the content to another recording medium, or moving the content to another recording medium, permit or inhibit execution of processing corresponding to the request, based on the control information and the ID.

5. The system according to claim 4, wherein
if the content recorded on the recording medium which does not have a medium ID is moved to another recording medium, the content manager moves the content and control information thereof which are recorded on the recording medium which does not have a medium ID, to the another recording medium, and thereafter deletes the content and the control information thereof recorded on the recording medium which does not have a medium ID.

6. The system according to claim 5, wherein
when copying or moving of the content recorded on the recording medium which does not have a medium ID to another recording medium is requested, the content manager releases enciphering of the content or an encipher key thereof with use of the ID, thereafter enciphers again the content or the encipher key with use of an ID of the another recording medium as a copy destination or a move destination, and records the content to the another recording medium.

7. A computer system comprising:
a device ID storage device configured to store a device ID used for safety management of contents; and
a content manager capable of managing enciphering/decoding of a content, for each recording medium onto which the content is to be recorded, with use of a medium ID specific to the recording medium onto which the content is to be recorded, and configured to manage the enciphering/decoding of the content with use of the device ID if the content is recorded onto a recording medium which does not have a medium ID.

8. The system according to claim 7, wherein
the device ID of the device ID storage device is managed by a BIOS of the computer system, and
the content manager obtains the device ID from the BIOS upon identification from the BIOS.

9. The system according to claim 8, wherein
the device ID storage device is constructed by a BIOS-ROM for storing the BIOS, and
the BIOS-ROM has a safe area which cannot be accessed from users and where the device ID is stored.

10. The system according to claim 8, wherein
the content is added with control information for limiting reproducing, copying, or moving of the content,
the BIOS manages code data for detecting alteration to the control information, and
when a request is issued for reproducing a content recorded on a recording medium which does not have a medium ID, copying the content to another recording medium, or moving the content to another recording medium, the content manager permits or inhibits execution of processing corresponding to the request, based on the control information and the code data for detecting alteration.

11. The system according to claim 10, wherein
if the content recorded on the recording medium which does not have a medium ID is moved to another recording medium, the content manager moves the content and control information thereof which are recorded on the recording medium which does not have a medium ID, to the another recording medium, and thereafter deletes the content and the control information thereof recorded on the recording medium which does not have a medium ID.

12. The system according to claim 11, wherein
when copying or moving of the content recorded on the recording medium which does not have a medium ID to another recording medium is requested, the content manager releases enciphering of the content or an encipher key thereof with use of the device ID, thereafter enciphers again the content or the encipher key with use of a medium ID of the another recording medium as a copy destination or a move destination, and records the content to the another recording medium.

13. A computer system comprising:
a device ID storage device configured to store a device ID used for safety management of contents; and
a content manager capable of managing enciphering/decoding of a content, for each recording medium onto which the content is to be recorded, with use of a medium ID specific to the recording medium onto which the content is to be recorded, and configured to manage the enciphering/decoding of the content with use of the device ID if the content is recorded onto a recording medium which does not have a medium ID, wherein
the device ID of the device ID storage device is managed by a BIOS of the computer system,
the content manager obtains the device ID from the BIOS upon identification from the BIOS, the content is added with control information for limiting reproducing/copying/moving of the content, the BIOS manages code data for detecting alteration to the control information, and if a content recorded on a recording medium which does not have a medium ID is copied to another recording medium, control information in the recording medium which does not have a medium ID is updated such that a value indicating possible copy operations allowed for the content is decremented by one, the content recorded on the recording medium which does not have a medium ID and the updated control information are copied to the another recording medium, and a value of the code data for detecting alteration is updated based on the updated control information.

14. The system according to claim 13, wherein when copying or moving of the content recorded on the recording medium which does not have a medium ID to another recording medium is requested, the content manager releases enciphering of the content or an encipher key thereof with use of the device ID, thereafter enciphers again the content or the encipher key with use of a medium ID of the another recording medium as a copy destination or a move destination, and records the content to the another recording medium.

15. A computer system capable of dealing with contents and comprising a content manager configured to perform safety management of the contents, the content manager including:

a first manager unit configured to, when a content is recorded onto a recording medium having a medium ID, encipher the content or an encipher key thereof with use of the medium ID and record the content onto the recording medium; and a second manager unit configured to, when a content is recorded onto a recording medium which does not have a medium ID, encipher the content or an encipher key thereof with use of a device ID specific to the computer system managed by a BIOS of the computer system, and record the content onto the recording medium which does not have a medium ID.

16. A computer system comprising:

a system program for controlling of the computer system, the system program managing a device ID specific to the computer system; and a content management system for managing enciphering/decoding of a content to be recorded onto a recording medium which does not have a medium ID of the computer system, with use of the device ID specific to the computer system.

17. The system according to claim 16, wherein the content is added with control information for limiting reproducing/copying/moving of the content, the system program manages code data for detecting alteration to the control information, and when reproducing of a content recorded on a recording medium which does not have the medium ID, copying thereof to another recording medium, or moving thereof to another recording medium is requested, the content management system permits or inhibits execution of processing as requested, based on the control information and the code data for detecting alteration.

18. A computer system having a device ID specific to the computer system, comprising:

a device ID obtaining unit configured to obtain the device ID from the computer system; and a content manager configured to manage enciphering/decoding contents to be recorded on a recording medium which does not have a medium ID of the computer system with use of the device ID.

19. A content protect method applied to a computer system capable of dealing with contents to protect the contents against improper use, comprising:

if a content is recorded onto a recording medium having a medium ID, enciphering the content or an encipher key thereof with use of the medium ID and recording the content onto the recording medium having the medium ID; and if a content is recorded onto a recording medium which does not have a medium ID, enciphering the content or an encipher key thereof with use of a device ID specific to the computer system managed by a BIOS in the computer system and recording the content onto the recording medium which does not have a medium ID.

20. A content protect method for protecting contents dealt with in a computer system having a device ID specific to the computer system against improper use, comprising:

obtaining the device ID from the computer system; and managing enciphering/decoding of a content to be recorded onto a recording medium which does not have a medium ID of the computer system with use of the device ID.

21. A content protect method for protecting contents dealt with in a computer system against improper use, comprising managing a device ID specific to the computer system by a system program for hardware control of the computer system;

obtaining the device ID from the system program; and managing enciphering/decoding of a content to be recorded onto a recording medium which does not have a medium ID of the computer system with use of the device ID.

* * * * *